March 23, 1954 J. W. HUTCHINS 2,673,298
RECORDING INFRARED GAS ANALYZER
Filed Sept. 6, 1949 6 Sheets-Sheet 2

INVENTOR.
J. W. HUTCHINS
BY Hudson & Young
ATTORNEYS

INVENTOR.
J. W. HUTCHINS
BY Hudson & Young
ATTORNEYS

March 23, 1954  J. W. HUTCHINS  2,673,298
RECORDING INFRARED GAS ANALYZER
Filed Sept. 6, 1949  6 Sheets-Sheet 5

INVENTOR.
J. W. HUTCHINS
BY Hudson & Young
ATTORNEYS

March 23, 1954   J. W. HUTCHINS   2,673,298
RECORDING INFRARED GAS ANALYZER
Filed Sept. 6, 1949   6 Sheets-Sheet 6

INVENTOR.
J. W. HUTCHINS
BY
ATTORNEYS

Patented Mar. 23, 1954

2,673,298

UNITED STATES PATENT OFFICE 2,673,298

RECORDING INFRARED GAS ANALYZER

Joseph W. Hutchins, Bartlesville, Okla., assignor to Phillips Petroleum Company, a corporation of Delaware Application September 6, 1949, Serial No. 114,157

22 Claims. (Cl. 250—43.5)

This invention relates to infrared analyzers. In another aspect, it relates to an explosion proof structure provided with heating and cooling means to maintain desired temperatures at various parts of the structure. In still another aspect, it relates to a fluid heating system. In still another aspect, it relates to a source of infrared radiation provided with cooling means.

Heretofore, many types of apparatus have been proposed for analyzing a liquid or gas sample which selectively absorbs radiation at predetermined frequencies within the infrared spectrum. A very common analyzer of this type includes an infrared source which cooperates with an optical system to produce two beams of infrared radiation. One of these beams is passed through a cell containing a sample of the pure component for which the analysis is to be made and, thence, through a cell containing the sample to be analyzed to a detector which converts the infrared radiation incident thereon into an electrical voltage representative thereof. The other beam is passed, either directly or through a cell containing air, to the sample cell and, thence, to a second detector of the type specified. The detectors are connected in an electrical circuit, such as a Wheatstone bridge, so that the respective voltages produced thereby are in electrical opposition, and the resultant voltage is utilized to operate an indicating or recording instrument, such as a recording potentiometer.

The beam which passes through the cell containing the pure component is not affected by changes in the concentration of said component in the test sample whereas the second beam is affected by changes in concentration of said component in the test sample. Accordingly, the unbalance voltage produced by the Wheatstone bridge circuit is proportional to the concentration of said component in the test sample, and this unbalance voltage, as stated, may be utilized directly to indicate the concentration of said component or, alternatively, it may be utilized to rebalance the bridge and, in so doing, to move an indicator to a position representative of the concentration of said component in the test sample.

The described optical system may be varied, in many instances, so suit the particular requirements of a given process stream. For example, where two components are present in the stream whose concentration varies inversely, the second beam of radiation may be passed through a cell containing a pure sample of the second component before it passes through the sample cell. In this manner, the sensitivity of the instrument is substantially increased. In still another modification, one beam is passed through the sample to the first detector cell while the other beam is passed directly to the second detector cell without passing through the sample cell. Finally, various types of filters, interference cells, mirrors and other components are utilized in the optical system to meet varied operating conditions.

While such instruments are far superior to periodic sampling and analysis of the process stream, certain limitations are inherent in them which introduce inaccuracies in the indications produced by the instrument. Such inaccuracies are particularly serious where the analyzer is utilized as an automatic control device so that the accuracy of the process control itself is directly dependent upon the accuracy of the analyzer. One of the most serious problems of this type is drift of the instrument reading produced by aging of circuit components, and particularly by temperature changes in the room where the analyzer is located. Further, the analyzer is ordinarily used for analysis of process streams containing hydrocarbons or other readily explosive materials. Hence, the use of such analyzers has, in the past, produced a definite fire and explosion hazard.

In my co-pending application, Serial No. 103,158, filed July 5, 1949, now Patent No. 2,579,825, entitled "Analyzer," I have provided a novel standardizing circuit for substantially completely eliminating drift produced by aging of circuit components, and replacement of various electrical parts of the circuit. In this co-pending application, I have also described a system for maintaining a constant pressure within the sample cell which also aids materially in reducing drift.

In accordance with this invention, I eliminate drift produced by temperature changes in the room or other location where the analyzer is mounted. Further, in accordance with this invention, I have provided a structure which eliminates or greatly minimizes hazards due to the inflammable or explosive nature of the process stream to be analyzed, together with hazards resulting from the presence of explosive or inflammable materials in the vicinity of the analyzer.

It is an object of the invention to provide an improved infrared analyzer embodying a novel heating and cooling system for maintaining the various units of the analyzer at a constant temperature.

It is a further object to provide an analyzer in which hazards resulting from the presence of inflammable or explosive materials are eliminated or greatly minimized.

It is a still further object to provide a novel heating unit from which fluid is discharged at a very constant predetermined temperature.

It is a still further object to provide a source of infrared radiation together with means for adequately cooling such source to maintain it at a predetermined temperature.

It is a still further object to provide a system for heating the test sample to a predetermined temperature before it is fed to the optical system of the analyzer.

Various other objects, advantages and features of the present invention will become apparent from the following detailed description and the appended claims.

Referring now to Figures 1 to 4, inclusive, the analyzer includes a base 10 having an upright panel 11 suitably secured thereto, as by angle irons 12. Mounted upon the panel 11 is a recording potentiometer 14 of a type well known to those skilled in the art.

Figure 1:
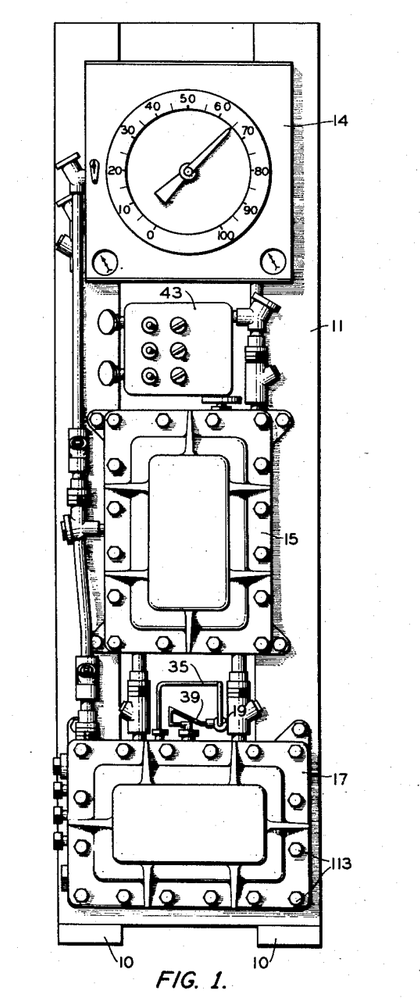
Figure 1 is a front elevational view of an infrared analyzer constructed in accordance with this invention.
Figure 2:
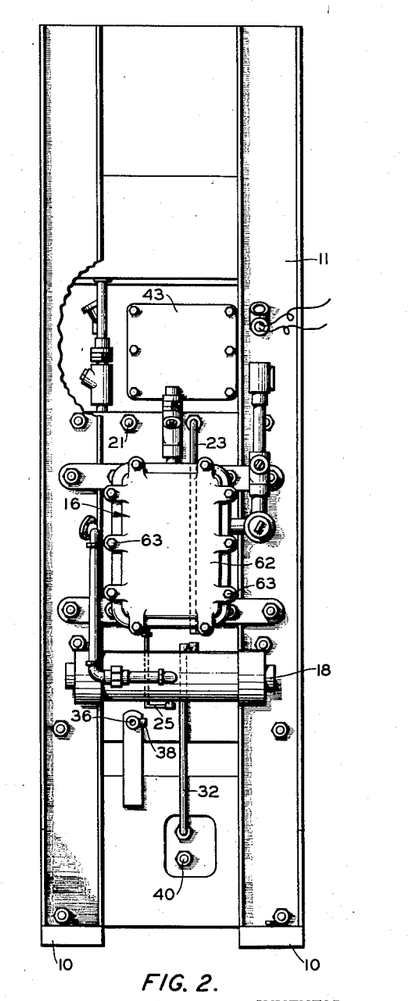
Figure 2 is a rear elevational view of the analyzer shown by Figure 1.
Figure 3:
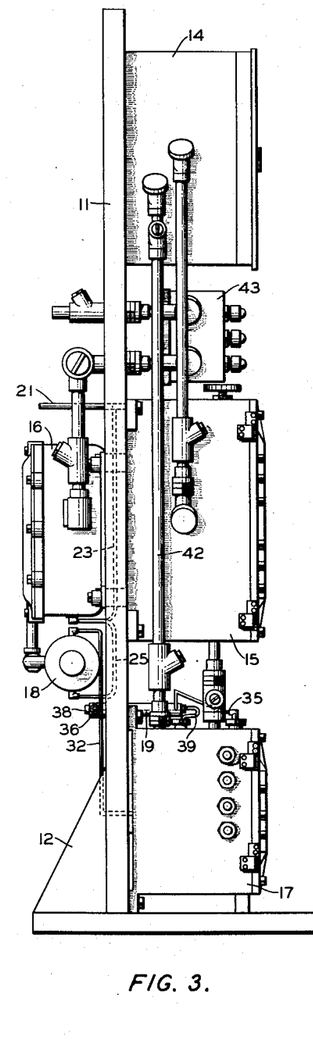
Figure 3 is a side elevational view of the analyzer shown by Figure 1.

Also mounted upon the panel 11 is a series of heavy metal compartments or boxes for housing the respective units of the analyzer. These includes a compartment 15 housing a recalibration unit, such as that described in my aforesaid co-pending application, Serial No. 103,158, a transformer compartment 16, and a compartment 17 housing the optical system of the amplifier and the power supply unit. Also mounted upon the panel 11 are a heater unit 18 and a heat exchanger 19.

Figure 4:
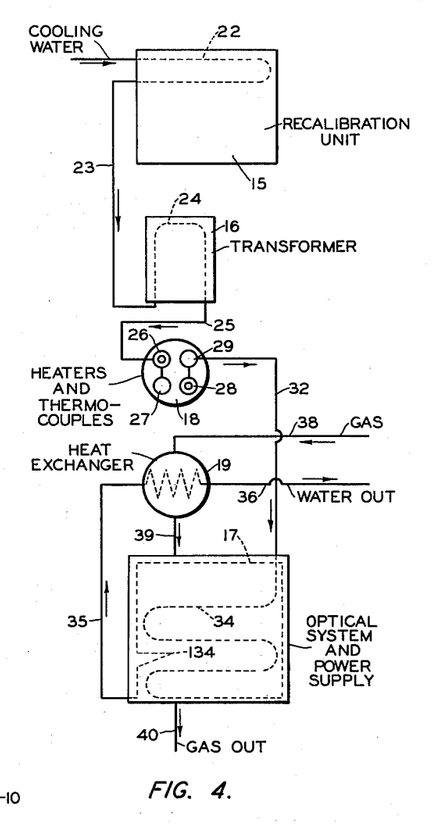
Figure 4 is a schematic diagram of the fluid circulation system.

In accordance with the invention, cooling fluid, such as water, enters the apparatus by a pipe 21 which communicates with a cooling coil 22 mounted in the compartment 15. The cooling fluid passes from coil 22 through a conduit 23 to a coil 24 mounted within compartment 16. From the coil 24, the cooling fluid passes through a conduit 25 to the heater unit 18. The compartments 15, 16 both contain electrical components which are heated during operation thereof, and the fluid circulated through coils 22, 24 cools these components to a safe operating temperature.

The unit 18 includes a first heater 26, a first temperature sensitive element 27 controlling heater 26, a heater 28, and a second temperature sensitive element 29 controlling heater 28, it being understood that the fluid passes successively through the units 26, 27, 28 and 29. The elements 27, 29 are set to closely adjacent temperatures and their joint operation is such that a very constant outlet temperature is provided for the fluid despite substantial variations in its entering temperature.

From the heater unit 18, the heated fluid passes through a conduit 32 to a system of conduits 34 mounted in the compartment 17. In the compartment 17, the heated fluid is also circulated through a region in thermal contact with the housing for the filament or other source of infrared radiation 136 within the compartment after passing through the conduits 34. Accordingly, the circulation of fluid performs the joint function of maintaining the interior of compartment 17 accurately at a predetermined temperature and also prevents the source of infrared radiation from elevating the temperature existing within the compartment. From the conduits 34, the fluid passes by a conduit 35 through the heat exchanger 19 to an outlet conduit 36. The gas sample to be analyzed enters heat exchanger 19 by a conduit 38 and, thence, enters the optical system compartment 17 through a conduit 39. In the exchanger, the sample is raised to the temperature existing within the compartment 17 so that the analysis is made under conditions of constant temperature and, by the apparatus described in my aforesaid co-pending application, Serial No. 103,158, at constant pressure. The gas sample leaves the compartment 17 by a conduit 40.

It will be apparent that, by a single system of cooling fluid circulation, I cool the compartments 15, 16 while, at the same time, I maintain the compartment 17 and the sample gas at an extremely constant elevated temperature. The analyzer structure shown by Figures 1 to 3, inclusive, also include a number of pipes, such as pipe 42, for passage of electrical conductors from one compartment to another, these conduits eliminating any hazards resulting from defective wiring. A compartment 43 is also provided which serves as a junction box for the main power supply lines and other circuit components.

Figure 5:
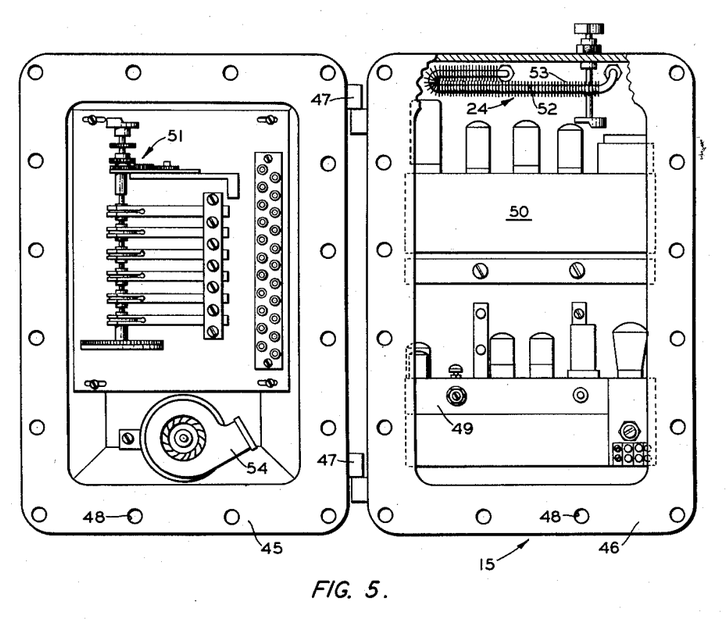
Figure 5 is a front elevational view, partially in section, of the compartment housing the recalibration circuit with the door of this compartment in open position.

Referring now to Figure 5, it will be noted that the compartment 15 includes two box-like structures 45, 46 formed from heavy metal and connected by hinges 47. The structures 45, 46 are provided with complementary openings 48 spaced around their respective edges so that the two structures may be bolted together, as shown by Figure 1, to form a unitary structure which is substantially completely sealed and explosion proof. The structure 46 contains a pair of metal chassis 49 and 50 upon which are mounted the tubes, transformers, and other electrical components forming a part of a circuit for recalibrating the Wheatstone bridge of a recorder, as described in my aforesaid co-pending application, Serial No. 103,158. The structure 45 contains a cam switch 51 also forming a part of the aforementioned recalibration circuit. The coil 24 is mounted in the top of structure 46 and consists of a metal tube 52 carrying a series of longitudinally spaced fins 53 which aid in the interchange of heat between the liquid within tube 52 and the atmosphere within compartment 15. The structure 45 also includes a blower 54 which maintains a continuous circulation of air within compartment 15, thus aiding materially in cooling it.

Figure 6:
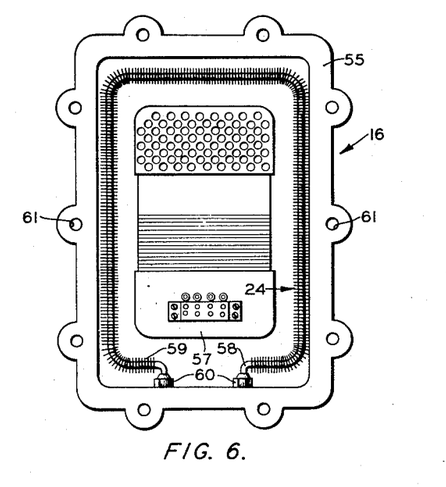
Figure 6 is a front elevational view of the transformer compartment with the cover removed.

Referring now to Figure 6, the compartment 16 includes a heavy metal shell 55 within which is mounted a constant voltage transformer 57. The coil 24 surrounds the transformer and consists of a metal tube 58 provided with a series of longitudinally spaced fins 59. If desired, spiral or helical fins may be substituted for the fins 53 or 59. The ends of tube 58 are provided with sealed fittings 60 which permit passage of liquid through the tube but prevent passage of air into or out of the compartment therethrough. The shell 55 is provided with a series of eyelets 61 which are spaced around its edge and these eyelets permit a cover 62, Figure 2, to be secured tightly against the shell by bolts 63. Thus, the compartment 16 is effectively sealed with resultant elimination of explosion and fire hazards.

Figure 7:
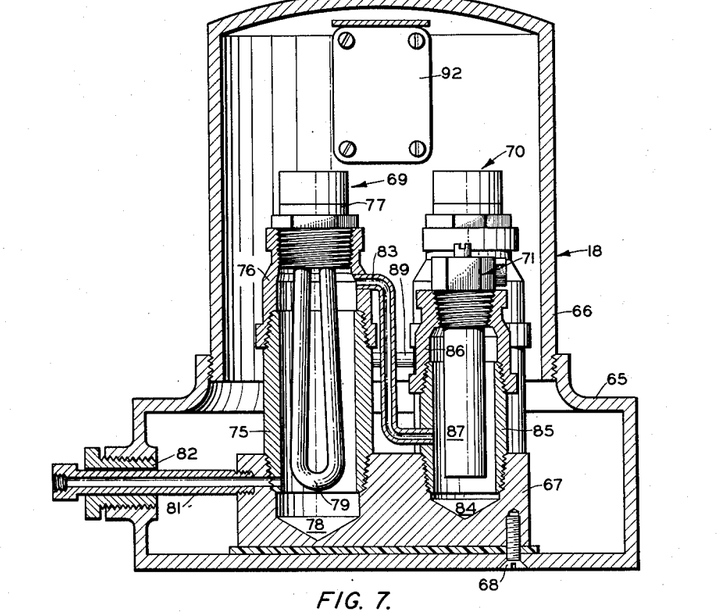
Figure 7 is a sectional view taken along the lines 7—7 of Figure 8.
Figure 8:
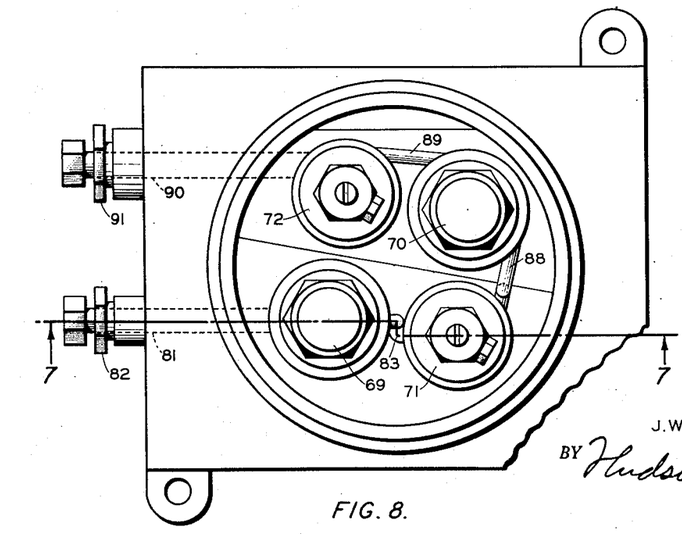
Figure 8 is a horizontal sectional view of the heating unit.
Figure 9:
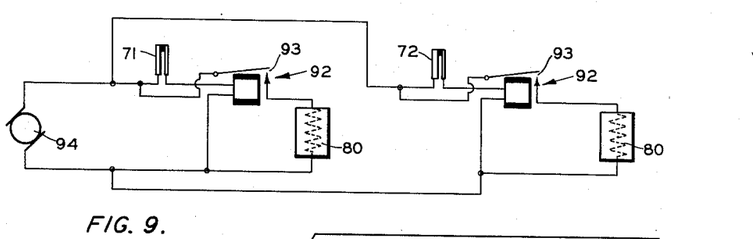
Figure 9 is a schematic circuit diagram of the heater unit.

Referring now to Figures 7, 8, and 9, I have shown a modified heater unit 18 which is mounted within a sealed container formed by an annular base 65 having a generally cylindrical cap 66 threaded thereto. A metal block 67 is secured to the base, as by a screw 68, and this block carries a pair of heaters 69, 70, and a pair of temperature sensitive elements 71 and 72. Each of the heaters 69, 70 is formed by a cylindrical shell 75 screw threaded in base 67, a shell 76 screw threaded to shell 75, and a cap 77 screw threaded in shell 76. These parts define a chamber 78 within which is mounted a metal conduit 79 carrying an electrical heater element 80, Figure 9. Fluid is admitted to the chamber 78 by a pipe 81 communicating with conduit 25, Figure 4, this conduit being carried within a sealed fitting formed by a sleeve 82 and an internally screw threaded boss in the base 65. The conduit 81 communicates through suitable bores in block 67 and sleeve 75 with the interior of chamber 78. The fluid is heated within the chamber and passes therefrom through a conduit 83 to temperature sensitive element 71. The elements 71, 72 both include a chamber 84 formed by a sleeve 85 screw threaded in block 67, a sleeve 86 screw threaded in sleeve 85 and a switch unit 87 screw threaded in sleeve 86. The switch 87 is a thermal switch of well-known design, such as shown in U. S. Patent 2,257,990 to Wilford J. Turenne, and closes when the temperature of the fluid in chamber 84 is less than a predetermined value. As stated, fluid flowing through conduit 83 passes from heater 69 to element 71. From element 71, the fluid passes by a conduit 88 to the second heater 70 and, thence, by conduit 89 to the second temperature sensitive element 72. The liquid is discharged from element 72 through a conduit 90 and a fitting 91 similar to the fitting described in connection with conduit 81, this fitting communicating with the conduit 32, Figure 4. Also mounted within the cap 66 are a pair of relays, one of which is shown at 92, which are connected in circuit as shown by Figure 9.

In Figure 9, it will be noted that two identical circuits are provided for controlling the respective resistance wires 80 of the heaters 69 and 70. In each circuit, the resistance 80 is connected in circuit with the contacts 93 of relay 92 and a current source 94 while the winding of the relay is connected in circuit with one of the temperature responsive switches 71 or 72 of Figure 8 and the current source 94. Temperature sensitive element 71 is actuated at a slightly lower temperature than element 72 to close its associated relay contacts 93 and thereby energize heater 80. Accordingly, a minor decrease in the temperature of the fluid passing through the elements 71, 72 causes actuation of only one heater whereas a further decrease in temperature causes actuation of both heaters simultaneously. I have found that the temperature of the fluid leaving unit 18 may be very accurately regulated by the described combination of heaters and temperature responsive elements, this constant fluid temperature, in turn, maintaining an extremely constant temperature within the compartment 17.

Figure 10:
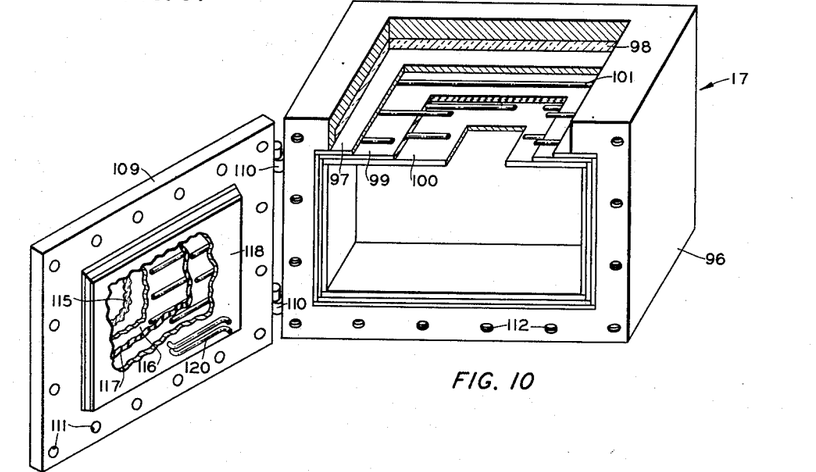
Figure 10 is a perspective view of the optical system compartment with the door thereto in open position and with parts broken away to show the interior construction.
Figure 11:
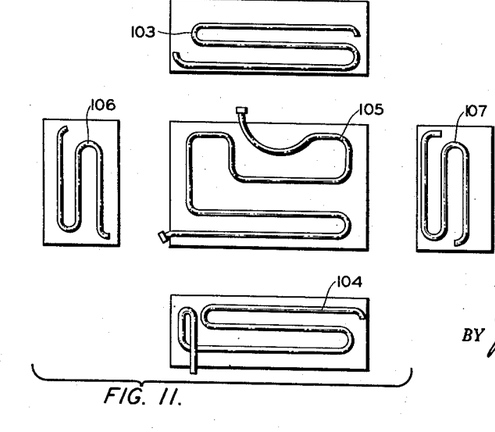
Figure 11 is a view of a portion of the cooling conduits of Figure 10 with the parts in disassembled relation.
Figure 12:
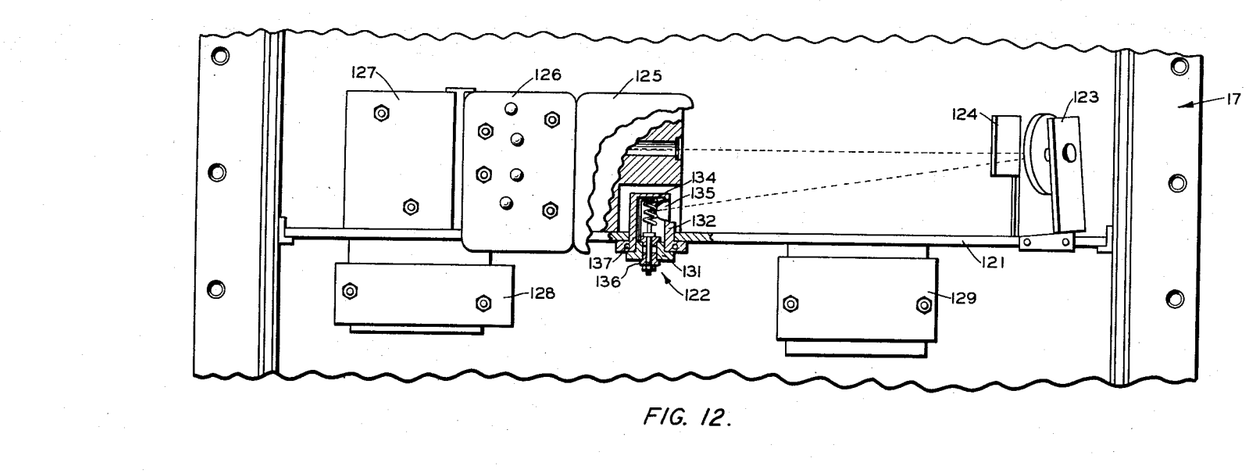
Figure 12 is a front elevational view, partially in section, of the optical system and power supply unit.

Referring now to Figures 10, 11 and 12, it will be noted that the compartment 17 includes an outer wall 96 of box-like configuration. Mounted within the outer wall 96 is a plate 97 forming a part of the outer wall and separated therefrom by a layer 98 of heat insulating material. A first inner wall 99 and a second inner wall 100 are formed interiorly of plate 97, the region between plate 97 and wall 99 together with the region between walls 99, 100 being filled with a suitable heat insulating material, such as rock wool. A conduit 101 is disposed within both of said regions, Figure 11 showing the manner in which the conduit is mounted between the outer wall and the first inner wall. From this figure, it will be noted that this part of the conduit comprises a top section 103, a bottom section 104, a rear section 105, and side sections 106, 107. The respective sections of the conduit are joined together, as by pieces of rubber tubing or other flexible coupling, to form a single continuous path which traverses the top, bottom, rear and sides of the compartment 17. The part of the conduit disposed between the two inner walls 99, 100 is arranged in the same manner as shown by Figure 11, and it forms a continuous path with this part of the conduit. A door 109 is secured to the structure 96 by hinges 110, this door having a series of openings 111 around its edge which register with corresponding tapped bores 112 formed in the outer wall 96 to the end that the door may be rigidly secured to the structure 96 by bolts 113, as is clearly illustrated in Figure 1. When so bolted, the door and structure 96 form a sealed compartment which is explosion proof since there is no communication between the interior and exterior thereof.

At the central portion of the door is a structure which includes a wall 115 having a plate 116 of metal spaced inwardly therefrom, the region between the wall and plate being filled with a suitable heat insulating material. A first inner wall 117 and a second inner wall 118 are spaced from the plate 116, and the regions between the walls are filled with a suitable heat insulating material. A conduit 120 is mounted between the walls in such fashion that it makes two convolutions in the regions between plate 116 and inner wall 117 together with two additional convolutions between the walls 117 and 118. The conduit 120 forms a continuous path with the conduit 101 disposed in the regions between the walls 97, 99 and 100. Furthermore, the structure just described upon the door cooperates with the corresponding structure in the unit 96 to form a triple walled structure with the regions between the walls being filled with heat insulating material and being traversed by the conduits 101 and 120. When the heated fluid from heater 18, Figure 4, is passed through these conduits, the interior of compartment 17 is maintained at a very constant elevated temperature. Although the described structure is preferred for best results, in some cases the wall 100 with its associated conduit arrangement and heat insulating material may be omitted.

Referring now to Figure 12, it will be noted that an optical system is mounted within compartment 17 upon a shelf 121. This optical system includes a source 122 of infrared radiation, parabolic mirrors or other reflecting devices 123, a trimmer 124, a cell unit 125, a cell unit 126, and a detector unit 127. By way of example, unit 125 may contain two cells, each of which is traversed by one of the twin beams of radiation produced by reflecting device 123, one cell being filled with air and the other cell being filled with a pure sample of the component to be analyzed for. The unit 126 may contain a cell traversed by both beams of radiation and containing the sample to be anaylzed while unit 127 contains a pair of bolometers or other detectors of infrared radiation. Alternatively, as previously pointed out, any other suitable optical system of the character already described may be mounted within compartment 17. Also mounted in the compartment 17 are a pair of transformers 128, 129 forming a part of the power supply unit for the analyzer. The heat generated by operation of these transformers and the infrared source aids in maintaining the constant elevated temperature within the compartment 17.

The infrared source 122 comprises an annular base 131 having an upstanding cylindrical shell 132 secured thereto in any suitable manner. A filament 134 is mounted within the cylindrical member 132 behind an opening 135 which is provided for the passage of infrared radiation therethrough. One terminal of the filament 134 is connected to the base 131 while its other terminal is connected to an insulating structure 136 which is accessible from the exterior of the device. The shell 132 has a flange formed thereon which is bored to form a conduit 137 for the passage of fluid in thermal contact with the member 132. This heated fluid cools the infrared source housing and prevents it from raising the temperature within the compartment above its predetermined value. Preferably, the heated fluid first passes from the heater 18, Figure 4, through the conduits disposed in the walls of the compartment 17 and thence to the bore 137 in the source housing.

Figure 13:
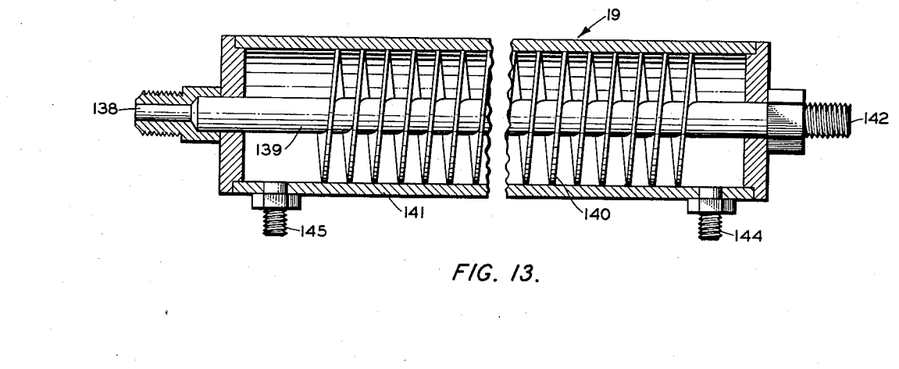
Figure 13 is a vertical sectional view of a heat exchanger.

From the source housing, the liquid passes by conduit 35, Figures 3 and 4, to the inlet portion 138, Figure 13, of the heat exchanger 19. Thereupon, the fluid passes through a conduit 139 in the heat exchanger which is provided with a helical fin 140, this fin contacting the cylindrical shell 141 of the exchanger. Thence, the fluid is discharged from the outlet 142 of the heat exchanger to conduit 36, Figure 4. The gas sample to be analyzed enters the exchanger 19 from conduit 38 through an inlet 144, Figure 13, hence it passes by a tortuous path through a region defined by helical fin 140, the conduit 139, and the shell 141 until it reaches the outlet of the exchanger and is discharged through fitting 145 and line 39, Figure 4.

As a result of its passage through the heat exchanger, the gas enters compartment 17 and the sample cell 126, Figure 12, at substantially the same temperature as that existing within the compartment. Furthermore, the gas sample is maintained at constant pressure in the manner described by my co-pending application, Serial No. 103,158, so that it is analyzed under optimum conditions.

From the foregoing description, it will be seen that I have achieved the objects of the invention in providing an infrared analyzer in which the various electrical and optical units are housed in sealed compartments of sturdy construction, thereby eliminating fire and explosion hazards. Moreover, the novel heaters and temperature sensitive elements cooperate with the fluid circulation system to the end that the same fluid is utilized both to cool the parts in certain units of the apparatus and to heat other parts of the apparatus to a constant, accurately maintained, predetermined temperature. By circulating fluid through the infrared source housing, it is cooled, and the temperature of its compartment is not raised by operation of the filament. Finally, I have provided apparatus in which conditions of temperature and pressure are maintained constant throughout the whole period of analysis, even though this period may extend for several days or even months while the apparatus is on continuous control duty.

While the invention has been described in connection with a present, preferred embodiment thereof, it is to be understood that this description is illustrative only and is not intended to limit the invention, the scope of which is defined by the appended claims.

Having described my invention, I claim:

1. An infrared analyzer including a series of explosion proof compartments housing; respectively, a calibrating unit, a transformer, and a power supply together with an optical system including a source of infrared radiation; a cooling coil in said calibration compartment and said transformer compartment; a heater; a temperature sensitive element for regulating said heater; means for circulating cooling fluid successively through said coils and said heater to said element, thereby to provide a predetermined outlet temperature for said fluid; a series of conduits mounted in the walls of said source compartment; a heat exchanger; means for circulating the heated fluid through said series of conduits and through a region in thermal contact with the source housing to said heat exchanger; and means for passing a gas sample through said exchanger in heat exchange relation with said fluid to the interior of said source compartment.

2. An infrared analyzer including a series of explosion proof compartments housing; respectively, a calibration unit, and an optical system including a source of infrared radiation, a cooling coil in said calibration compartment; a heater; a temperature sensitive element for regulating said heater; means for circulating cooling fluid successively through said coil and said heater to said element, thereby to provide a predetermined outlet temperature for said fluid; a series of conduits mounted in the walls of said source compartment; a heat exchanger; means for circulating the heated fluid through said series of conduits and through a region in thermal contact with the housing of said source to said heat exchanger; and means for passing a gas sample through said exchanger in heat exchange relation with said fluid to the interior of said source compartment.

3. In an infrared analyzer having an explosion proof compartment housing an optical system including a source of infrared radiation, a heater, and a temperature sensitive element for regulating said heater; improved means for maintaining a predetermined temperature in said compartment comprising, in combination, a series of conduits formed in the walls of said compartment, and means for circulating fluid successively through said heater, said temperature sensing element, and said conduits.

4. An infrared analyzer in accordance with claim 3 wherein the heated fluid is circulated through a region in thermal contact with the housing of said source of infrared radiation after circulation thereof through the conduits in said compartment.

5. In an infrared analyzer having an explosion proof compartment housing an optical system including a source of infrared radiation, a first heater, a first temperature sensitive element for regulating the temperature of said first heater, a second heater, and a second temperature sensitive element for regulating the temperature of said second heater; improved means for maintaining a predetermined temperature in said compartment comprising, in combination, a series of conduits formed in the walls of said compartment, and means for circulating fluid successively through said first heater; said first temperature sensing element, said second heater, said second temperature sensing element, and said conduits, said first temperature sensing element being adapted to regulate said first heater responsive to small variations in fluid temperature from a predetermined temperature, and said second temperature sensing element being adapted to regulate said second heater responsive to larger variations in fluid temperature of said fluid from said predetermined temperature.

6. An infrared analyzer in accordance with claim 5 wherein the heated fluid is circulated through a region in thermal contact with the housing of said source of infrared radiation after circulation thereof through the conduits in said compartment.

7. In an infrared analyzer having an explosion proof compartment housing an optical system including a source of infrared radiation, a first heater, a first temperature sensitive element for regulating the temperature of said heater, a second heater, and a second temperature sensitive element for regulating the temperature of said second heater; improved means for maintaining a predetermined temperature in said compartment comprising, in combination, a series of conduits formed in the walls of said compartment, and means for circulating fluid successively through said first heater, said first temperature sensing element, said second heater, said second temperature sensing element, and said conduits; said first temperature sensing element being adapted to regulate said first heater responsive to small variations in fluid temperature from a predetermined temperature, and said second temperature sensing element being adapted to regulate said second heater responsive to larger variations in fluid temperature from said predetermined temperature; a heat exchanger, means for passing the fluid emerging from said conduits through said heat exchanger, and means for passing a sample to be analyzed through said exchanger in heat exchange relation with said fluid to the interior of said compartment.

8. An infrared analyzer in accordance with claim 7 wherein the heated fluid is circulated through a region in thermal contact with the housing of said source of infrared radiation after circulation thereof through the conduits in said compartment.

9. An infrared analyzer including a series of explosion proof compartments housing; respectively, a calibrating unit, a transformer, and a power supply together with an optical system including a source of infrared radiation; a cooling coil and said calibration compartment and said transformer compartment; a heater; a temperature sensitive element for regulating said heater; a second heater; a second temperature sensitive element for regulating said second heater; means for circulating cooling fluid successively through said coils, said first heater, said first element, said second heater, and said second element, thereby to provide a predetermined outlet temperature for said fluid, said first element being responsive only to minor variations in the temperature of said fluid from its predetermined value, and said second element being responsive to larger changes in the temperature of said fluid from its predetermined value; a series of conduits mounted in the walls of said source compartment; a heat exchanger; means for circulating the heated fluid through said series of coils and through a region in thermal contact with the housing of said source to said heat exchanger; and means for passing a gas sample through said exchanger in heat exchange relation with said fluid to the interior of said source compartment.

10. In an infrared analyzer, an explosion proof heated compartment comprising, in combination, an outer wall of heavy metal of sufficient strength to withstand an explosion, a door hinged to said outer wall to form a closed compartment therewith, means for bolting said door to said wall at a number of regions spaced about the periphery of said door, an inner wall, heat insulating material filling the region between the inner wall and the outer wall, and a series of conduits mounted in said region, said conduits being adapted for passage of a heated fluid therethrough to maintain said compartment at substantially a constant temperature.

11. In an infrared analyzer having an optical system including a source of infrared radiation, and a power supply unit mounted within an explosion proof compartment, constructed in accordance with claim 10; improved temperature control mechanism comprising means for utilizing the heat generated by said analyzer to supplement the heat furnished by the fluid circulating through said conduits.

12. An infrared analyzer having an explosion proof compartment constructed in accordance with claim 11 in which the fluid circulating through said conduits is passed through a region in thermal contact with the housing of said source of infrared radiation.

13. In an infrared analyzer, an explosion proof heated compartment comprising, in combination, an outer wall of heavy metal of sufficient strength to withstand an explosion, a door hinged to said outer wall to form a closed compartment therewith, means for bolting said door to said wall at a number of regions spaced about the periphery of said door, a first inner wall, a second inner wall, heat insulating material filling the region between the outer wall and the first inner wall and the region between the first and second inner walls, and a series of conduits mounted in said regions, said conduits being adapted for passage of a heated fluid therethrough to maintain said compartment at substantially a constant temperature.

14. In an infrared analyzer having an optical system including a source of infrared radiation and a power supply unit mounted within an explosion proof compartment, constructed in accordance with claim 13; improved temperature control mechanism comprising means for utilizing the heat generated by said analyzer to supplement the heat furnished by the fluid circulating through said conduits.

15. An infrared analyzer having an explosion proof compartment constructed in accordance with claim 14 in which the fluid circulating through said conduits is passed through a region in thermal contact with the housing of said source of infrared radiation.

16. In an infrared analyzer, an explosion proof heated compartment comprising, in combination, an outer wall of heavy metal of sufficient strength to withstand an explosion, a door hinged to said outer wall to form a closed compartment therewith, means for bolting said door to said wall at a number of regions spaced about the periphery of said door, a first inner wall, a second inner wall, heat insulating material filling the region between the outer wall and the first inner wall and the region between the first and second inner walls, and a series of conduits mounted in said regions, a double walled structure protruding from the inner surface of said door, heat insulating material filling the regions between said walls and said door, a series of conduits mounted between said walls and between the inner wall and door, said conduits communicating with the conduits mounted in the walls of said compartment whereby heating fluid circulated through said conduits maintains a constant temperature within said compartment.

17. An infrared analyzer having an optical system including a source of infrared radiation, and a power supply unit mounted within an explosion proof compartment, constructed in accordance with claim 16; improved temperature control mechanism comprising means for utilizing the heat generated by said analyzer to supplement the heat furnished by the fluid circulating through said conduits.

18. An infrared analyzer having an explosion proof compartment constructed in accordance with claim 14 in which the fluid circulating through said conduits is passed through a region in thermal contact with the housing of said source of infrared radiation.

19. A source of infrared radiation comprising, in combination, an annular base, a cylindrical housing protruding upwardly from said base and in thermal contact therewith, an opening formed in said housing, a filament disposed within said housing behind said opening, a contactor connecting said filament to said base, and a conduit formed in said base whereby fluid circulated through said conduit is in thermal contact with the housing of said filament.

20. A source of infrared radiation comprising, in combination, an annular base, a filament protruding upwardly therefrom, a metal housing surrounding said filament and disposed in the path of radiation therefrom, said metal house being in thermal contact with said base, an opening in said housing to permit passage of radiation from said filament therethrough, and a conduit formed in said base whereby fluid circulated through said conduit is in thermal contact with said housing.

21. A unit for heating a fluid to a predetermined temperature which comprises, in combination, a first heater, a first temperature sensing element, a second heater, a second temperature sensing element, and means for circulating fluid successively through said first heater, said first temperature sensing element, said second heater and said second temperature sensing element, said first temperature sensing element actuating said first heater at a predetermined temperature, said second temperature sensing element actuating said second heater at a temperature slightly below said predetermined temperature, said temperature sensing elements operating independently of one another.

22. A unit for heating a fluid to a predetermined temperature which comprises, in combination, a first electrical heater, a first temperature sensing element, a second electrical heater, a second temperature sensing element, and means for circulating fluid successively through said first heater, said first temperature sensing element, said second heater and said second temperature sensing element, a first relay having a set of contacts controlling the supply of heating current to said first heater, a first switch actuated by said first temperature sensing element and connected in circuit with the winding of said first relay, a second relay having a set of contacts controlling the application of heating current to said second heater, a second switch controlled by said second temperature sensing element, and connected in circuit with the winding of said second relay, said first temperature sensing element actuating said first heater through said first switch and said first relay when the temperature of said fluid falls below a predetermined value, and said second temperature sensing element actuating said second heater through said second switch and said second relay at a temperature slightly below said predetermined value, said temperature sensing elements operating independently of one another.

JOSEPH W. HUTCHINS.

References Cited in the file of this patent

UNITED STATES PATENTS

| Number | Name | Date |
|---|---|---|
| 1,307,070 | Wennagel | June 17, 1919 |
| 1,519,555 | Ruben | Dec. 16, 1924 |
| 1,635,581 | Meadowcroft | July 12, 1927 |
| 1,838,508 | Wantz | Dec. 29, 1931 |
| 1,916,861 | Hynes et al. | July 4, 1933 |
| 1,996,634 | Vaughan | Apr. 2, 1935 |
| 2,114,173 | Boerstler | Apr. 12, 1938 |
| 2,295,046 | Noel | Sept. 8, 1942 |
| 2,307,061 | Morrow | Jan. 5, 1943 |
| 2,314,800 | Pineo | Mar. 23, 1943 |
| 2,345,757 | Lester | Apr. 4, 1944 |
| 2,395,489 | Major et al. | Feb. 26, 1946 |
| 2,439,005 | Jensen | Apr. 5, 1948 |
| 2,480,363 | Hamer | Aug. 30, 1949 |
| 2,561,134 | Peters | July 17, 1951 |